United States Patent
Preiss

(10) Patent No.: US 7,400,617 B1
(45) Date of Patent: Jul. 15, 2008

(54) INTEGRATED VOICE-OVER-INTERNET PROTOCOL PROCESSOR

(75) Inventor: Frank Preiss, Geltendorf (DE)

(73) Assignee: Infineon Technologies North America Corp., San Jose, CA (US)

( * ) Notice: Subject to any disclaimer, the term of this patent is extended or adjusted under 35 U.S.C. 154(b) by 588 days.

(21) Appl. No.: 09/660,882

(22) Filed: Sep. 13, 2000

Related U.S. Application Data

(60) Provisional application No. 60/153,762, filed on Sep. 13, 1999.

(51) Int. Cl.
*H04L 12/66* (2006.01)
(52) U.S. Cl. ............ 370/352; 370/495
(58) Field of Classification Search .......... 370/401, 370/352, 351, 463, 465, 466, 356, 423
See application file for complete search history.

(56) References Cited

U.S. PATENT DOCUMENTS

| | | | |
|---|---|---|---|
| 5,799,068 A * | 8/1998 | Kikinis et al. ............ 379/93.06 |
| 6,119,179 A * | 9/2000 | Whitridge et al. ............ 710/72 |
| 6,141,341 A * | 10/2000 | Jones et al. ............ 370/352 |
| 6,345,047 B1 * | 2/2002 | Regnier ............ 370/352 |
| 6,373,835 B1 * | 4/2002 | Ng et al. ............ 370/352 |
| 6,449,269 B1 * | 9/2002 | Edholm ............ 370/352 |
| 6,526,131 B1 * | 2/2003 | Zimmerman et al. ... 379/106.09 |
| 6,567,399 B1 * | 5/2003 | Schuster et al. ............ 370/352 |
| 6,574,213 B1 * | 6/2003 | Anandakumar et al. ..... 370/349 |
| 6,587,454 B1 * | 7/2003 | Lamb ............ 370/352 |
| 6,600,734 B1 * | 7/2003 | Gernert et al. ............ 370/352 |
| 6,658,020 B1 * | 12/2003 | Isaka et al. ............ 370/466 |
| 6,658,027 B1 * | 12/2003 | Kramer et al. ............ 370/516 |
| 7,023,868 B2 * | 4/2006 | Rabenko et al. ............ 370/419 |
| 2002/0061012 A1 * | 5/2002 | Thi et al. ............ 370/352 |
| 2003/0086556 A1 * | 5/2003 | Welch et al. ............ 379/265.09 |
| 2003/0147381 A1 * | 8/2003 | Nelson et al. ............ 370/352 |
| 2006/0072552 A1 * | 4/2006 | Shnitzer et al. ............ 370/352 |
| 2007/0036150 A1 * | 2/2007 | Pounds et al. ............ 370/352 |

\* cited by examiner

*Primary Examiner*—Chi Pham
*Assistant Examiner*—Kevin Mew
(74) *Attorney, Agent, or Firm*—Fish & Richardson P.C.

(57) ABSTRACT

A single-chip network processor (12) for a Voice-over-Internet Protocol phone integrates a universal serial bus port (21), a pair of IEEE 802.3 MACs (40), and repeater, and a pair of pulse code modulation (PCM) ports (24) such that the network processor can be easily combined with other peripherals to transmit both voice and computer data over an Internet protocol network.

11 Claims, 3 Drawing Sheets

INTEGRATED VOICE-OVER-INTERNET PROTOCOL PROCESSOR

RELATED APPLICATIONS

This application claims the benefit of provisional Application No. 60/153,762, filed Sep. 13, 1999, the benefit of which is hereby claimed under 35 U.S.C. § 119.

FIELD OF THE INVENTION

The present invention relates to communication systems in general, and in particular to Voice-over-Internet Protocol (IP) communication systems.

BACKGROUND OF THE INVENTION

As computer networks become more prevalent and powerful, the boundaries between traditional telephony and data communication become increasingly blurred. For example, the Internet is a global network of computers wherein data is transmitted from a source to a destination as a series of individually addressed packets. Such packets are most often used to carry computer data. However, it is also possible to transmit real time voice data over a packetized network, provided that proper compression techniques are used and the speed of the network is fast enough to avoid producing noticeable delay. When operating correctly, voice data transmitted over the Internet has nearly the same quality as voice data transmitted over conventional telephone lines.

One advantage of using an Internet protocol (IP) network to carry both computer and voice data in an area is that only a single set of wiring is needed. This is particularly advantageous for large businesses where the cost of installing the wiring for both data and telecommunications networks is considerable.

Most voice over IP network telephones are controlled by a network processor that performs the functions of data compression and encoding as well as transmitting and receiving data from the computer network. In the past, such network processors had limited ability to interface with other peripherals, thereby requiring a number of other electronic subsystems to be provided in order to construct a functioning voice over IP telephone. To increase the number of potential applications for such processors and to reduce the cost of the systems that employ them, there is a need for a network processor having integrated peripheral interfaces.

SUMMARY OF THE INVENTION

The present invention is a voice over IP network processor that can be used for transmitting both computer and voice data over a packetized computer network. The network processor includes integrated circuitry that connects the processor to a variety of peripherals. Specifically, the network processor includes one or more integrated universal serial bus (USB) ports, IEEE 802.3 media access controllers (MACs), a repeater and integrated PCM HDLC ports that allow peripherals such as A/D and D/A converters to be easily interfaced with the processor. The peripheral interfaces are integrated into the processor through a flexible peripheral interconnect (FPI) bus.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
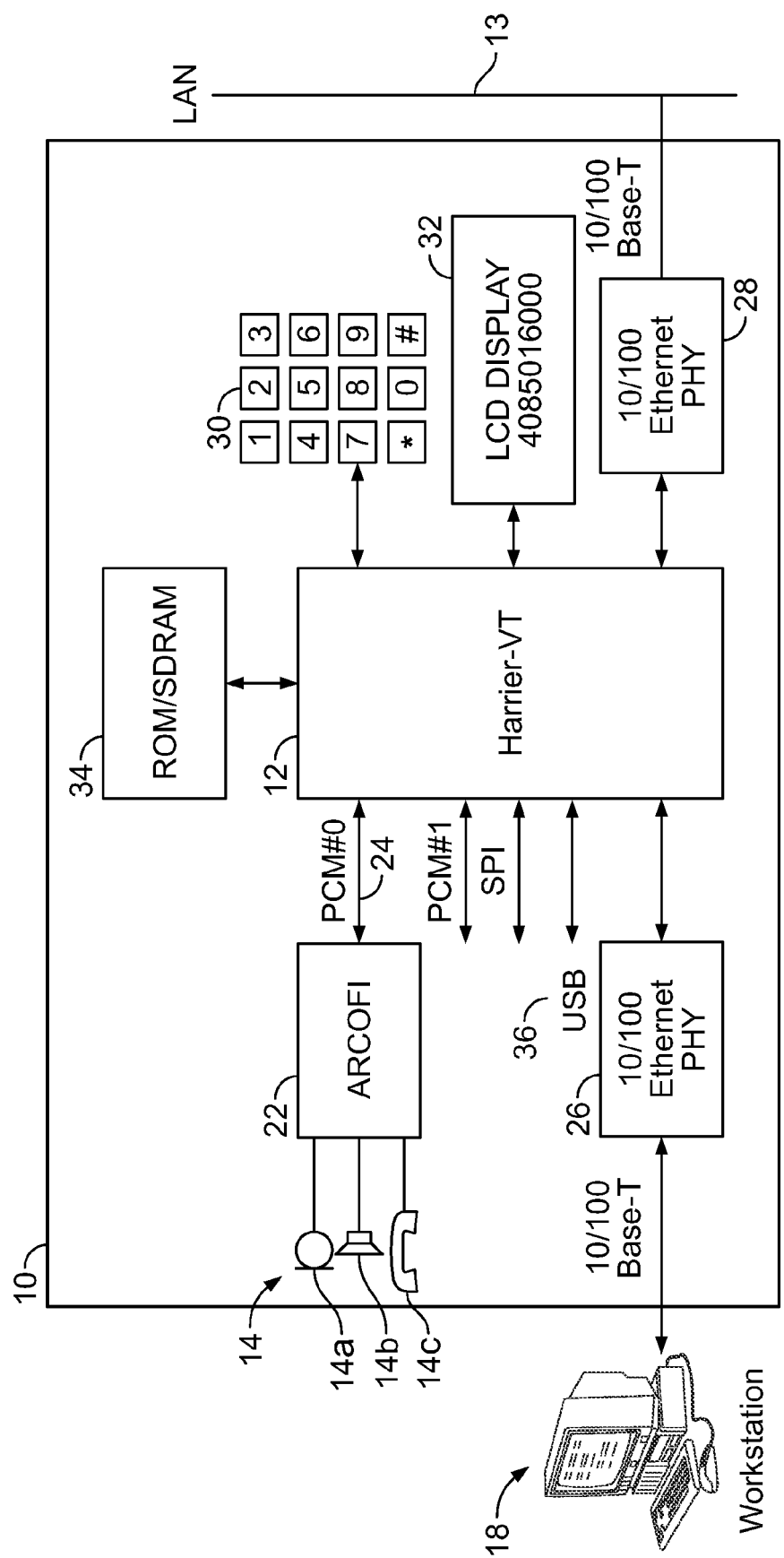
FIG. 1 is a block diagram of an Internet protocol phone in accordance with the present invention.

FIG. 1 is a block diagram of a Voice-over-Internet Protocol (IP) telephone system constructed in accordance with the present invention. The telephone system 10 comprises a network processor 12 that performs a variety of functions including assembling a digital voice signal into a series of packets and transmitting and receiving packets over a local area network 13.

The local area network 13 may be coupled to a wide area network such as the Internet, through a gateway (not shown). The telephone system 10 also includes components 14, including a microphone 14a, speaker 14b and a handset 14c that are connected to the network processor 12 through a digital-to-analog/analog-to-digital (DA/AD) converter 22. The DA/AD converter 22 is connected to the network processor 12 via an integrated pulse code modulation (PCM) port 24 that is described in further detail below. Each of the PCM ports can handle up to 30 time slots with each slot capable of handling a 64K bit/sec voice channel. The PCM ports therefore serve as the interface between the internal hardware of the IP processor and a external peripheral. In addition to transmitting and receiving voice data, the telephone system also transmits and receives data from a workstation 18 that is connected to the network processor 12 through an Ethernet port 26. A second Ethernet port 28 is used to connect the network processor to the local area network 13.

A keypad 30 is interfaced with the network processor 12 to allow a user to dial telephone numbers and an LCD display 32 is provided so that a user can see the information entered on the keypad. Finally, the telephone system 10 includes a memory unit 34 to store programs and other data required by the network processor 12.

Figure 2A:
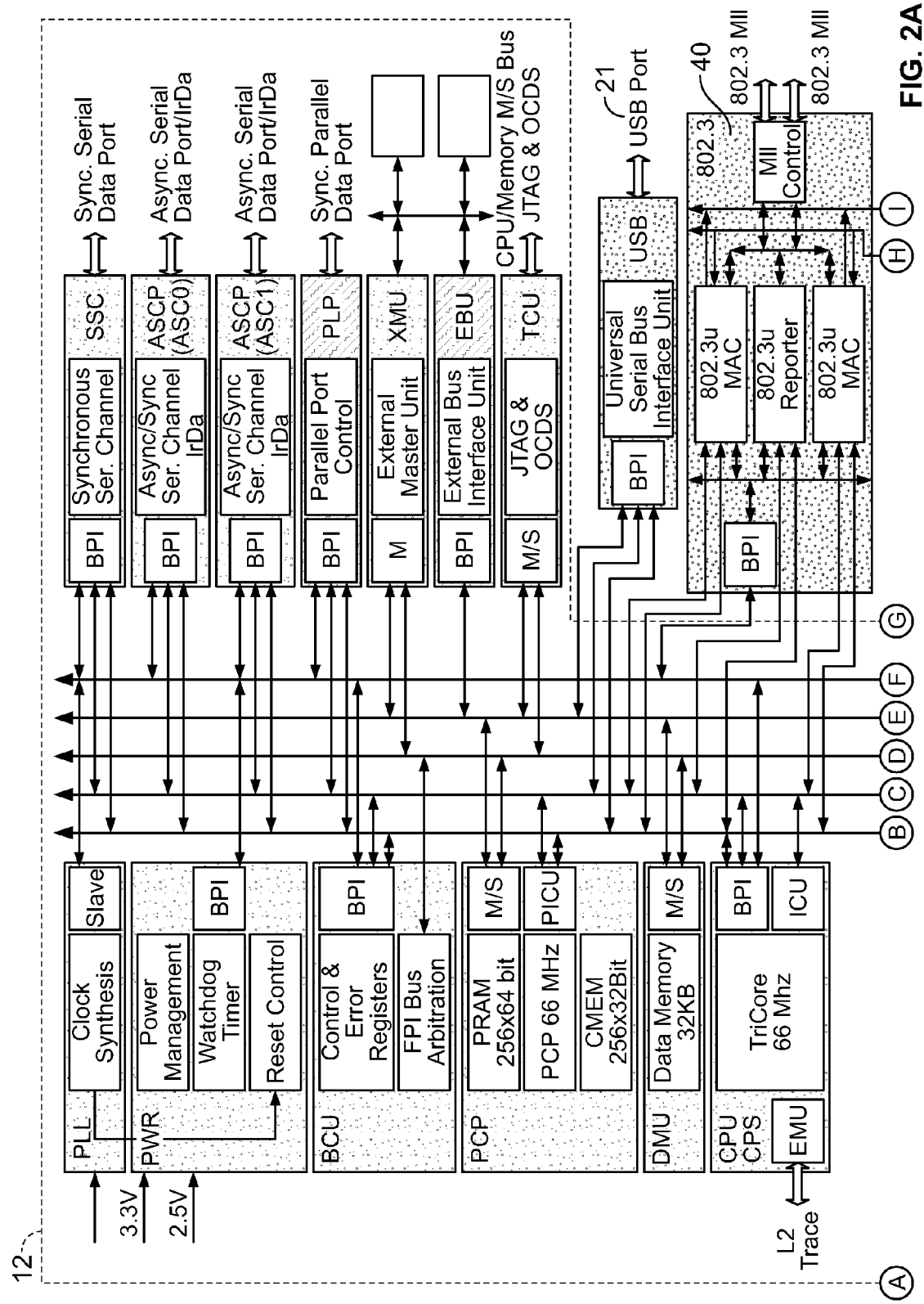
FIGS. 2A and 2B are a block diagram of a Voice-over-Internet Protocol processor including integrated USB ports, media access controllers, repeater ports and a pair of integrated pulse code modulation ports in accordance with the present invention.
Figure 2B:
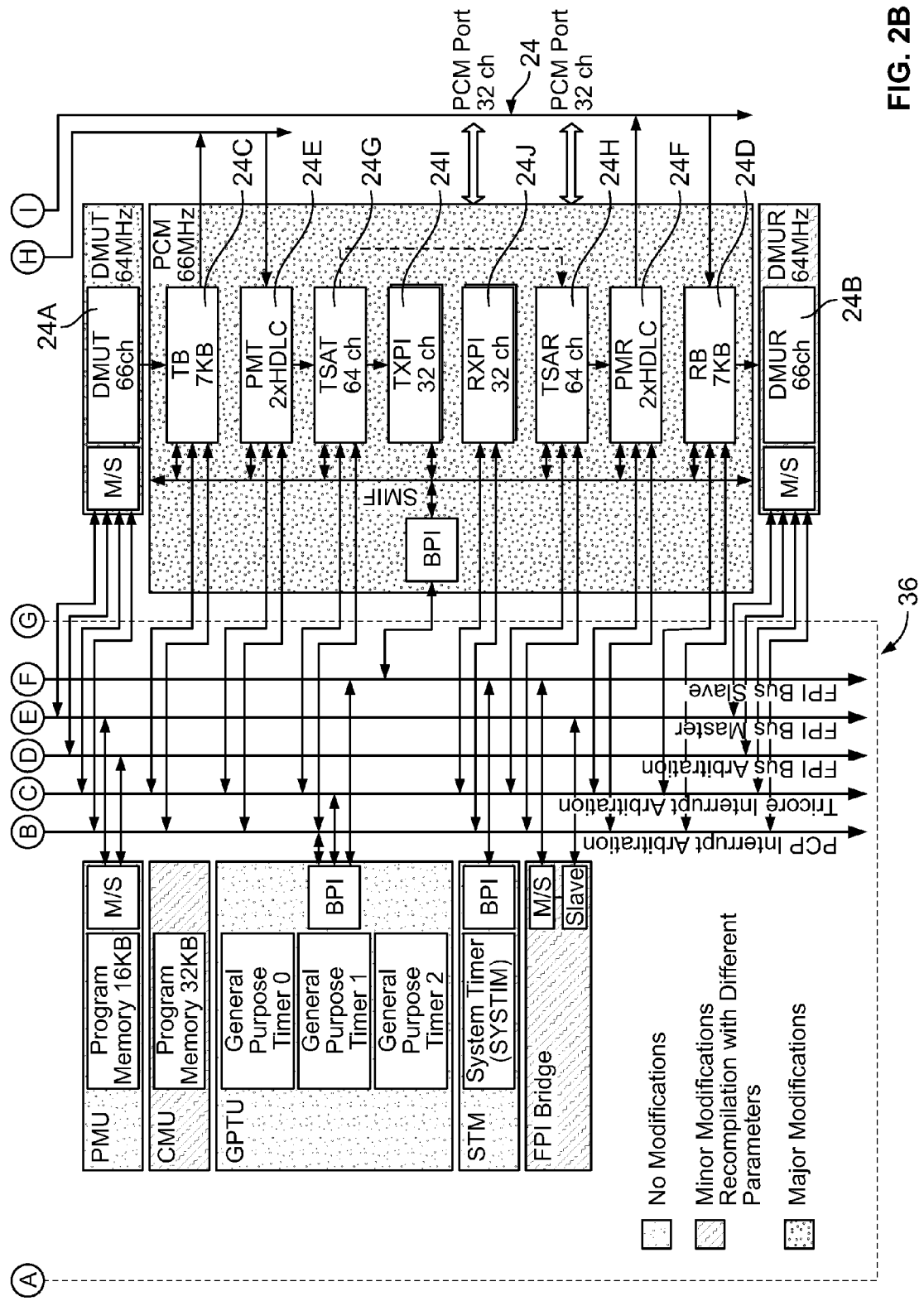

FIGS. 2A and 2B are a block diagram of the network processor 12, the details of which are more fully described in the specification titled "Harrier-VT" as attached as Appendix A. Although the presently preferred embodiment is constructed around the TRICORE and Harrier processors available from Infineon Technologies of San Jose, Calif., it will be appreciated that any computing architecture having the functionality described could be substituted.

Integrated USB Port

A USB port 21 is integrated on the same circuit as the network processor 12 as described in the specification entitled "Universal Serial Bus Device Controller 1.1" attached as Appendix B. The USB port 21 provides a simple interface to other USB compatible devices without having to provide external interfacing circuitry.

Integrated IEEE 802.3 MACs and Repeater

To connect the network processor directly to a local area network, the processor 12 includes a pair of IEEE 802.3 media access controllers and a repeater 40 in accordance with the IEEE standard.

Each of the USB ports, 802.3 MACs and the PCM ports are connected to a flexible peripheral interconnect bus 36 that is described in the specifications entitled "Flexible Peripherals Interconnect Bus Version 3.2" and "BPI Specification Draft Version 0.9" as attached as Appendices C and D, respectively.

Integrated PCM Ports

As discussed above, to provide a convenient interface to the DA/AD converter 22, the network processor 12 includes a pair of integrated PCM ports 24. The PCM ports comprise a number of sub-components including a data management unit transmit block 24a and data management receive block 24b that are described in the attached specification entitled "Macro Specification DMUT Version 2.2" and "Macro Specification DMUR Version 2.2" attached as Appendices E and F, respectively.

In addition, the PCM ports include a transmit and receive buffer 24c and 24d that are described in the specifications entitled "Macro Specification TB Version 2.1", "Macro Specification TB data sheet" and "Receive Buffer V2.1" attached as Appendices G, H and I, respectively.

Also included in the PCM ports 24 are a protocol machine transmit and receive blocks 24e and 24f that are described in the specifications entitled "Protocol Machine Transmit Version 2.2" and "Macro Specification PMR Version 2.1" attached as Appendices J and K, respectively.

A time slot assignee receive and transmit blocks 24g and 24h are included in the PCM ports 24 and are described in the specifications entitled "Timeslot Assigner Receive V2.2.1" and "Timeslot Assigner Transmit V2.2.1" attached as Appendices L and M, respectively.

The PCM port 24 also includes a receive/transmit port interface block 24i, 24j that are described in the specification entitled "Receive/Transmit Port Interface V2.3.1" attached as Appendix N.

A data management transmit and receive blocks 24a and 24b are connected to the FPI bus 36 through a master/slave interface that is described in the specification entitled "Platform Concept: SMIF Specification Version 1.0" attached as Appendix O.

The remaining components of the PCM port 24 are connected to the FPI bus 36 through a BPI interface as described in "BPI Specification Draft Version 0.9" attached as Appendix P.

As can be seen from the above description, the present invention is a single-chip voice over IP network processor having integrated interface ports that allow the processor to be easily coupled to a variety of external components and peripherals.

The embodiments of the invention in which an exclusive property or privilege is claimed are defined as follows:

1. A processor for use in a Voice-over-Internet Protocol telephone, including:
   an internal bus for routing of signals in the processor;
   a processing core to control the processor to transmit computer data and voice data over a computer network, the processor core including one or more pipelines to execute instructions, the processing core directly coupled to the internal bus;
   an on-chip memory directly coupled to the internal bus and separate from the processing core, the on-chip memory including a program memory to include instruction for execution by the processing core and a data memory to store cache for the processing core;
   a pulse code modulation (PCM) interface directly coupled to the internal bus and separate from the processing core and on-chip memory, the PCM interface including a PCM communication port for connection to an external voice codec;
   an Ethernet interface directly coupled to the internal bus and separate from the processing core, on-chip memory and PCM interface, the Ethernet interface including a repeater, one or more IEEE 802.3 media access controllers (MACs) and an Ethernet port for connection to an external network;
   an external bus unit directly coupled to the internal bus and separate from the processing core, on-chip memory, PCM interface and Ethernet interface, the external bus unit providing a bridge for connection through a device bus, other than the external network, to an external memory,
   wherein the instructions are configured such that when executed by the CPU,
      PCM coded speech data received by the PCM interface is transported to the external memory, read from the external memory by the processing core and compressed by the processing core and written back to the external memory, and voice data packets with such speech data are read from the external memory and forwarded to the 802.3 MAC and fed into the external network by the repeater, and
      voice data packets received by the Ethernet interface are transported to the external memory, read from the external memory by the processing core and decompressed by the processing core and written back to the external memory, and PCM coded speech data from the received voice data packets is transported by the PCM interface to the external voice codec,
   and wherein the internal bus, processing core, on-chip memory, PCM interface, Ethernet interface, and the external bus unit are integrated into a single chip.

2. The processor of claim 1, further comprising one or more universal serial bus (USB) ports.

3. The processor of claim 1, wherein one or more communication ports allow the processor core to be coupled to one or more external components without external interfacing circuitry.

4. The processor of claim 1, wherein each Ethernet port is operable to handle up to 30 time slots, and wherein each time slot is capable of handling a 64K bit/sec voice channel.

5. The processor of claim 1, wherein at least one pipeline supports one of arithmetic, load and store, and loop control operations for the processor core.

6. The processor of claim 1, wherein at least one pipeline is configured to execute at least one of integer instructions, bit operations, MAC instructions and conditional data jumps.

7. The processor of claim 1, wherein at least one pipeline is configured to execute load and store instructions, context operations, system instructions, address arithmetic and conditional and unconditional address instructions for the processor core.

8. The processor of claim 1, wherein at least one pipeline includes a loop hardware cache buffer operable to store location, target and minimal set of information required to execute repetitive loop within the at least one pipeline so as to achieve loop optimization.

9. The processor of claim 1, wherein the processor core includes separate address and data buses for the program memory and the data memory.

10. The processor of claim 1, wherein the internal bus is a flexible peripheral interconnect (FPI) bus.

11. The processor of claim 10, wherein the FPI bus is a demultiplexed, pipelined bus.

* * * * *